Sept. 29, 1964  F. A. ALCARO  3,150,506
FLEXIBLE COUPLING
Filed Dec. 24, 1962  2 Sheets-Sheet 1
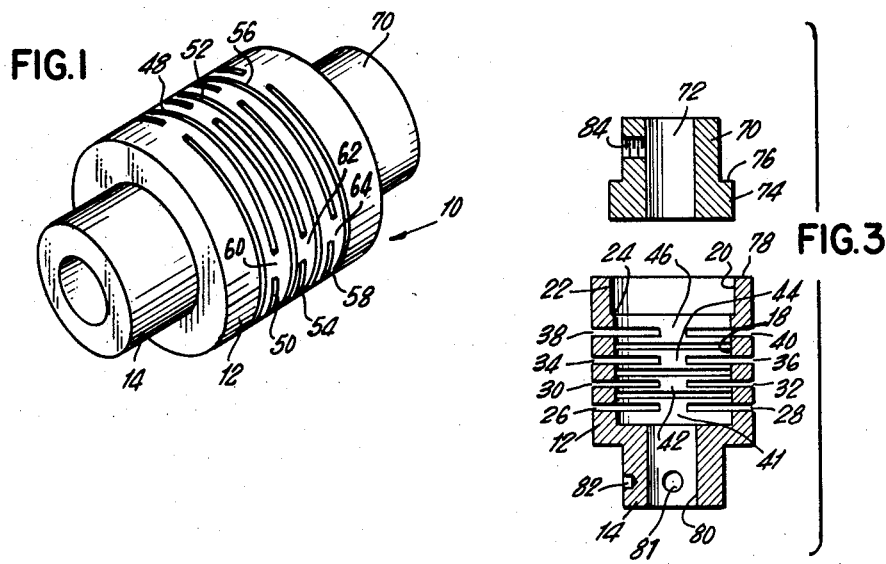
FIG.1
FIG.3
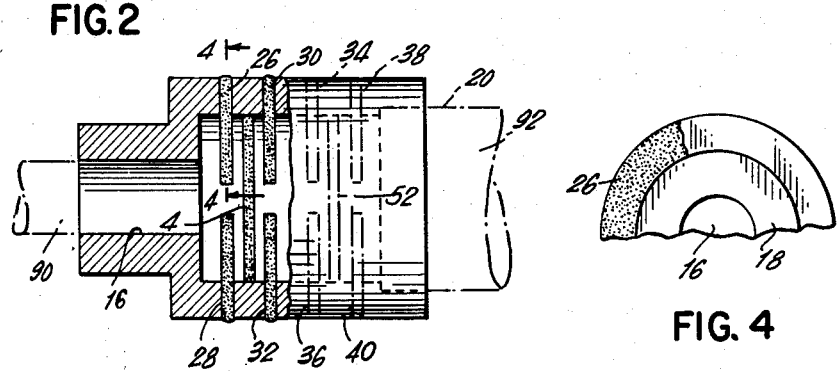
FIG.2
FIG.4
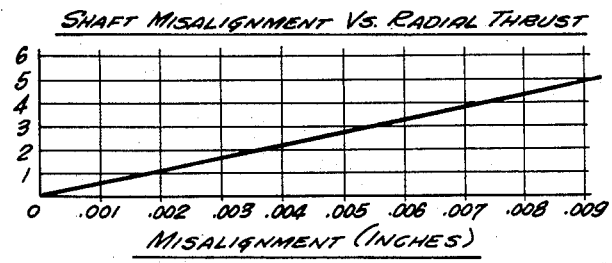
SHAFT MISALIGNMENT VS. RADIAL THRUST
FIG.5
INVENTOR.
FRANCIS A. ALCARO
BY
Amster & Levy
ATTORNEYS Sept. 29, 1964  F. A. ALCARO  3,150,506
FLEXIBLE COUPLING
Filed Dec. 24, 1962  2 Sheets-Sheet 2

INVENTOR.
FRANCIS A. ALCARO
BY Amster & Levy
ATTORNEYS

United States Patent Office 3,150,506
Patented Sept. 29, 1964

3,150,506
FLEXIBLE COUPLING
Francis A. Alcaro, Eastchester, N.Y., assignor to Santa Fe Instruments Inc., New York, N.Y., a corporation of New York
Filed Dec. 24, 1962, Ser. No. 246,839
2 Claims. (Cl. 64—15)

This invention relates to a flexible coupling and more particularly to a precision manufactured flexible coupling especially designed for use in the most exacting applications. This is a continuation-in-part of my copending application, Serial No. 68,216, filed on November 9, 1960, now Patent No. 3,071,942 and entitled Flexible Coupling and Method of Manufacture.

The primary objects of the present invention is to meet the need for a true precisioned instrument coupling, which while permitting linear and angular misalignment without angular backlash, allows parallel hub displacement.

Further object of the present invention resides in the provision of a flexible instrument coupling which has very close concentricity between both hub bores thereof. This feature is of utmost importance in instrument couplings and in the past conventional couplings have failed to provide close concentricity between hub bores. When rotating over 360° an ordinary flexible coupling will alternately add and subtract its inherent eccentricity to the shaft misalignment and thereby create undesirable and excessive side thrusts. Oscillating forces such as these side thrusts cause vibrations, speed fluctuations, exert undue stresses on shafts, ball bearings, gearings and other rotating parts, thus destroying the intended precision and performance of the instrument while making high speed applications impossible.

The present invention overcomes the deficiencies of the prior art flexible couplings and is therefore adapted for very exacting applications such as missile control instrumentation.

In the past it has been noted that the radial thrust which causes undesirable stresses on shafts and other rotating components has been a function of the shaft misalignment, but has been dependent not by way of a direct proportion, but by way of an exponential relationship such as a hyperbolic curve whereby with an increment of shaft misalignment there is an increasingly greater amount of radial thrust. An unexpected advantage of this invention lies in the fact that the radial thrust of the flexible coupling is exceedingly small and is in direct proportion to the shaft misalignment. Thus, the present invention is adapted for use in connecting two shafts even when there are linear and angular misalignments without causing any undue wear on the parts being coupled.

A further object of the present invention resides in the provision of a flexible coupling that is in static and dynamic balance and which is free from noise and vibration since there are no moving or wearing parts. The present invention has extreme life expectancy and has optimum flexibility with no backlash.

In order to achieve high precision in the manufacturing of the flexible coupling, a novel process may be employed wherein a tubular body is provided with a series of slots therein to form blades for the flexible coupling. In order to assure that there will be no distortion of the workpiece during the manufacture of the flexible coupling, a low melting point material is disposed in the slots which have already been cut in the body of the coupling while other slots are being cut whereby the workpiece is maintained against distortion.

These, together with the various ancillary objects and features of the present invention, which will become apparent as the following description proceeds, are attained by this flexible coupling and method of manufacture thereof, a preferred embodiment of the coupling being shown in the accompanying drawing, wherein:

FIG. 1 is a perspective view of a flexible coupling constructed in accordance with the concepts of the present invention;

FIG. 2 is an elevational view illustrating a step in manufacture of the flexible coupling, with parts being broken away to show other parts in detail;

FIG. 3 is an exploded longitudinal sectional view of the flexible coupling;

FIG. 4 is a partial sectional view taken along the plane of line 4—4 in FIG. 2;

FIG. 5 is a graph illustrating an important coupling characteristic of the invention;

Figure 6:
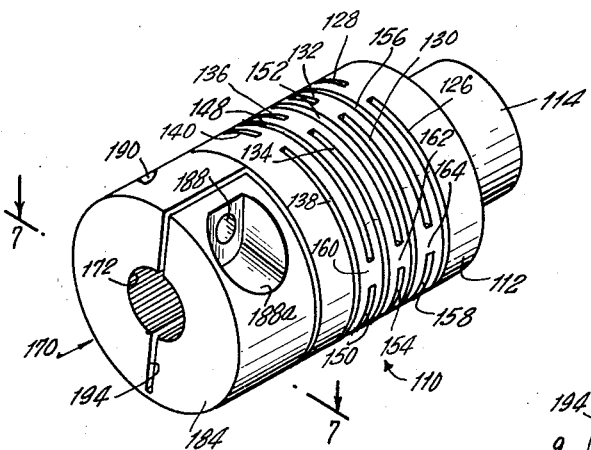
FIG. 6 is a perspective view similar to FIG. 1 of a coupling similar to that shown in FIG. 1 but having a different form of attachment means for connection to a shaft.

With continuing reference to the accompanying drawing wherein like reference numerals designate similar parts throughout the various views, reference numeral 10 is used to designate the precision flexible instrument coupling manufactured in accordance with the invention which includes a cylindrical body 12 formed of tempered beryllium copper, though it is within the concept of this invention to construct the body of stainless steel, Phosphor bronze, aluminum alloys, and other suitable metals and alloys thereof. The body 12 has a hub 14 integrally formed therewith, which hub is of a reduced diameter and which is provided with a bore 16. Drilled in the body 12 is a bore 18 of larger diameter than the bore 16. There is also drilled in the body 12 a hole 20 of larger diameter than the bore 18 which forms an offset portion 22 and a shoulder 24. The offset portion 22 is at the opposite end of the body 12 from that of the hub 14.

Cut in the body 12 are a series of pairs of slots 26, 28; 30, 32; 34, 36; and 38, 40. These slots extend throughout almost 180° leaving only pairs of ribs 41, 42, 44 and 46 therebetween. A second series of slots 48, 50; 52, 54; and 56, 58 which are alternately arranged with respect to the first series of slots and are also arranged in pairs, are disposed equidistantly between the respective pairs of slots 26, 28; 30, 32; 34, 36; and 38, 40 and defines therebetween pairs of web portions 60, 62, and 64.

Each of the pairs of slots 48, 50; 52, 54; and 56, 58 are also of approximately 180° and these slots are offset with respect to the slots 26 through 40 through an angle of 90° to thus form a series of blades.

The second hub 70 of the coupling is formed separately from the body 12 and is provided with a bore 72 which may be of the same size as the bore 16. A flange 74 is provided on the hub 70 for seating within the offset portion 22 and against the shoulder 24 with the surface 76 of the flange lined flush with the surface 78 of the body 12.

The hub 14 is provided with a bore 80 therethrough and a threaded aperture 81 is formed in the hub normal to the bore 80 so that when a shaft is disposed within the bore a set screw may be used to lock the shaft in place.

A partially drilled hole 82 for handling as is desired may be provided.

A threaded aperture 84 is also provided in the hub 70 normal to the bore 72 and communicating therewith for reception of another set screw for holding another shaft in place when inserted in the bore 72. The bore 72 and the bore 80 are carefully aligned in an extremely accurate manner and may be formed or re-machined after assembly of the hub 70 to the body 12 if desired.

The flexible coupling 10 is formed in accordance with a process wherein the bore 18 is first drilled in the body 12. Then, the undercut portion 22 is formed by drilling the opening 20 which is of larger diameter than the bore 18. As shown in FIG. 2, mandrels of different sizes and indicated at 90 and 92 respectively are inserted in the bore 16 and in the undercut portion 20 to grasp the body in a secure manner. Then, using a tool having a gang of three blades the slots 26, 30 and 34 are cut in the body. Subsequently, these slots are then filled with a suitable low melting point material. It has been found that sealing wax serves best of all materials inasmuch as there is substantially no distortion of the body when such material is used. However, low melting point alloys of various metals such as bismuth, antimony, lead, and the like can be used, certain of which are sold under the trademark "Cerro-True" by the Cerro De Pascco Co. and have been found to be satisfactory.

After the sealing wax has been disposed in the slots 26, 30 and 34 the workpiece is rotated or the tool is moved so that slots 28, 32 and 36 can then be cut. These slots are then filled with a low melting point material such as sealing wax and the tool is moved relative to the workpiece or vice versa so that the cutting action of the tool will form the slot 40 while the blades pass into the slots 36 and 32. All the slots made in the body are successively filled with sealing wax and after the slot 40 is cut, the slot 38 is then cut with the blades passing into the already cut slots 30 and 34.

Alternatively, after the slots 26, 30 and 34 have been cut, slot 36 can be cut with the blades passing into the slots 34 and 30 and subsequent to the slots 38, 32 and 36 being cut, slot 40 may be cut.

After sealing wax has been disposed in all of the slots 26 through 40, slots 48, 52 and 56 may be cut and with sealing wax disposed therein, slots 50, 54 and 58 are cut. Then, the hub 70 is pressed into the body 12 with the flange 74 engaging the shoulder 24 and the undercut portion 20 and with the surface 76 of the flange lying flush with the surface 78 of the body. A low melting point of solder is applied to this joint. Subsequently, the assembled coupling which has slots thereof filled with sealing wax is passed into a zone of heat and heated, whereby the sealing wax will be melted out and whereby the solder which has been applied to the joint will be more evenly distributed and effects a substantially perfect seal between the hub 70 and the body 12.

After the sealing wax has been removed, the bores 72 and 16 can be tested for exact concentricity within a tolerance of .001 inch with the hub bore diameter within a tolerance of .0003 inch.

A suitable finish can be electroplated or the coupling can be lacquer coated as desired.

Figure 8:
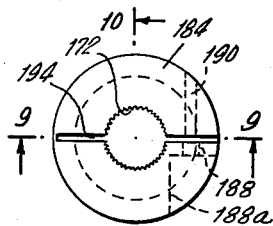
FIG. 8 is an end elevational view of the coupling shown in FIG. 6.
Figure 7:
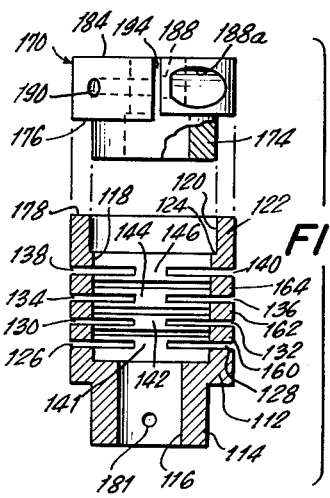
FIG. 7 is an exploded sectional view of the coupling of FIG. 6 taken along the line 7—7 of FIG. 6 looking in the direction of the arrows.
Figure 9:
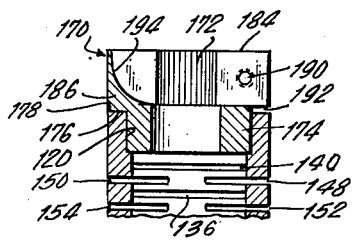
FIG. 9 is a partial plan view of the coupling of FIG. 6, partially sectioned along the line 9—9 of FIG. 8.
Figure 10:
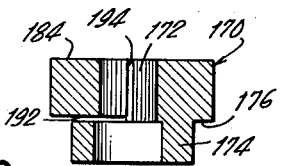
FIG. 10 is a sectional view of the second hub, or the splined attachment member, of the coupling of FIG. 6, taken along the line 10—10 of FIG. 8, looking in the direction of the arrows.

Referring now to FIGS. 6 through 10, there is shown a flexible coupling designated by the numeral 110 which is basically similar to the coupling 10 with the exception that a different form of attachment is provided such that the coupling 110 may be secured to a splined shaft. Specifically, the flexible coupling 110 includes a body 112. A first hub 114 of the coupling 110 is coaxially formed with the body 112 and projects from one end thereof. The hub 114 is formed with an axial, shaft-receiving opening 116 which has a threaded hole 181 intersecting the opening to receive a set screw for securement of the coupling to a shaft. The body 112 is formed with a main bore 118 forming a generaly thin walled construction for the body 112 and a second bore or cut-out 120 at the end of the body 112 opposite the first hub 114. The cut-out extends a short distance inward from the end, and has a diameter greater than the diameter of the main bore 118 thereby forming an offset portion 122 defined by the shoulder 124 at the inward edge of the cut-out 120. These constructions, as described so far, are identical to those in the coupling 10 illustrated in FIGS. 1 to 4.

In further similarity to the flexible coupling 10, the body 112 has a series of pairs of slots 126, 128; 130, 132; 134, 136; and 138, 140 spaced along the length of the body 112 and extending through almost 180° of the body leaving ribs 141, 142, 144 and 146, respectively, between the individual slots of each pair. A second series of slots 48, 50; 52, 54; and 56, 58 are formed in the body 112 at 180° locations across the body 112 and are spaced in between the first series of pairs of slots and are indexed 90° from the first series of slots. Ribs or web portions 160, 162, 164 are formed between the respective pairs of the second series of slots. In a manner identical with the coupling 10, the various first and second series of slots effectively provide a series of blades at 90° to the axis of the coupling to produce the flexible characteristics of the device.

The coupling 110 differs from the coupling 10 solely in the provision of the second hub 170 which is formed with a female spline 172 adapted to receive the splined end of a shaft. The second hub 170 has a cylindrical portion 174 along its axis which is complementary in diameter and length to the diameter and length of the cut-out portion 120 of the body 112. A shoulder 176 is formed at the edge of the cylindrical portion 174 which mates with the end surface 178 of the body 112. When the second hub 170 is secured with the body 112, the cylindrical portion 174 is received within the cut-out 120 with the inward end of the cylindrical portion 174 received against the shoulder 124 in the body and with the respective surfaces 176, 178 in engagement. This interconnection may be permanently secured by any conventional means such as welding, etc. The outer diameter of the remaining portion of the second hub 117 may be of any diameter desired and, in the particular embodiment shown in FIGS. 6 through 10, is equal to the diameter of the body 112.

The spline 172 is formed along the axis of the second hub 170 and securement of the spline 172 to the complementary spline of a shaft may be effected by the provision of a leaf member 184, which incorporates one-half of the spline 172 and which is secured to the remainder of the second hub 184 by a small connecting section 186 forming a spring hinge. A screw-receiving clearance opening 188 is provided in the hinged section 184 and includes a cut-out 188a adapted to receive the head of a screw. The other portion of the second hub has a threaded hole 190 in alignment with the opening 188. Upon the insertion of a screw through the opening 188 and into the threaded opening hole 190, the hinged portion 184 will be drawn toward the rest of the second hub 170 effectively reducing the diameter of the female spline 172 to engage same securely with the male spline of a shaft. The spring portion 184 of the second hub 180 may be conveniently formed integrally with the remainder of the second hub 170 by providing a slot 192 transverse to the axis of the hub to 180° of the hub (see FIG. 9) and a second slot 194 perpendicular to and intersecting the slot 192.

It will be appreciated that other forms of securement means for the flexible couplings may be manufactured in accordance with standard techniques for joining axially oriented members.

An unusual coupling characteristic of these flexible couplings is apparent from an inspection of FIG. 5 wherein it is noted that the radial thrust measured in pounds is directly proportional to the shaft misalignment measured in inches of the shafts received in the bores 16 and 72. Further, even at approximately .01 inch of shaft misalignment the radial thrust will be under 6 lbs. and such force will cause no undue stress on shafts, ball bearings, gearings or other rotating components which allows this type of flexible coupling to be used in the most exacting applications such as missile control instrumentation and the like. Further, it is to be noted that the angle of twist of this coupling results in an applied torque which is also directly proportional thereto within the elastic limits of this flexible coupling.

While preferred embodiments of the invention have been shown and described herein, it is obvious that numerous additions, changes and omissions may be made in such embodiments without departing from the spirit and scope of the invention.

What I claim is:

1. A flexible coupling comprising a cylindrical body having a first hub of reduced diameter integrally formed therewith and projecting from one end of said body, said body having a bore therein, said body being provided with a cut-out portion of larger diameter than said bore forming a shoulder in said body, a second hub secured to the other end of said body and projecting in an opposite direction from said first hub, said second hub being provided with a cylindrical portion of a diameter complementary to the diameter of said cut-out portion and being disposed in said cut-out portion with one side of said cylindrical portion engaging said shoulder, said first hub having a bore therethrough coaxial with said cylindrical body and of lesser diameter than the bore in said body, said second hub having a splined opening coaxial with said bore in said first hub, said body having a plurality of longitudinally spaced slots therein, said slots being arranged in equally spaced complementary oppositely disposed pairs, adjacent pairs of slots being radially offset from each other through an angle of ninety degrees, said slots extending normal to the longitudinal axis of said body.

2. A flexible coupling comprising a cylindrical body having a first hub integrally formed therewith and projecting from one end of said body, said body having a bore therein, said body being provided with a cut-out portion of larger diameter than said bore forming a shoulder in said body, a second hub secured to the other end of said body and projecting in an opposite direction from said first hub, said second hub being provided with a cylindrical portion of a diameter complementary to the diameter of said cut-out portion and being disposed in said cut-out portion with one side of said cylindrical portion engaging said shoulder, said hubs each having a bore therethrough of lesser diameter than the bore in said body, said body having a plurality of longitudinally spaced slots therein, said slots being arranged in equally spaced complementary oppositely disposed pairs, adjacent pairs of slots being radially offset from each other through an angle of ninety degrees, said slots extending normal to the longitudinal axis of said body.

References Cited in the file of this patent

UNITED STATES PATENTS

| | | |
|---|---|---|
| 2,753,702 | Dunn | July 10, 1956 |
| 3,071,942 | Alcaro | Jan. 8, 1963 |

FOREIGN PATENTS

| | | |
|---|---|---|
| 352,392 | Germany | June 8, 1920 |